June 30, 1970    L. J. WINDECKER    3,518,156
FIRE RETARDANT STRUCTURE
Filed Sept. 29, 1967
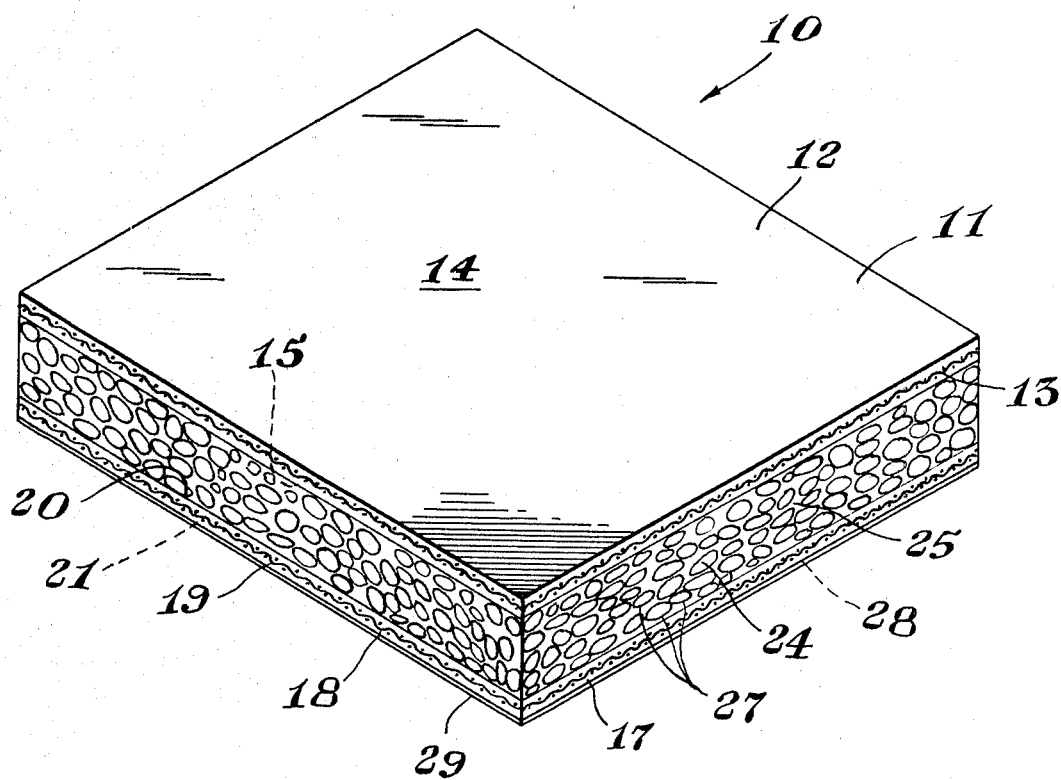
INVENTOR.
Leo J. Windecker
BY
AGENT

United States Patent Office 3,518,156
Patented June 30, 1970

3,518,156
FIRE RETARDANT STRUCTURE
Leo J. Windecker, Midland, Tex., assignor to The Dow Chemical Company, Midland, Mich., a corporation of Delaware
Filed Sept. 29, 1967, Ser. No. 671,792
Int. Cl. B32b 7/00, 33/00
U.S. Cl. 161—161
9 Claims

ABSTRACT OF THE DISCLOSURE

A laminate panel is prepared employing an open cell plastic foam impregnated with a phenol-formaldehyde type resin and hardened to maintain the open cell structure. Skins are provided of a similar resin. The resultant panel is fire retardant and does not give off noxious fumes under the influence of flames.

---

This invention relates to a fire retardant panel, and more particularly relates to a fire retardant laminar structure of a non-metallic nature.

For various applications, high strength structures or panels are required which are of a fire retardant nature. Generally, such structures are prepared of composites of metallic and non-metallic elements arranged in a layered manner to prevent the transmission of heat from one major face of the panel to the opposed major face of the panel. Such panels sometimes are prepared of fire retardant resinous materials which have chemically combined therein fire retardant elements such as chlorine, bromine, fluorine and the like. Such halogen-containing structures offer a significant and substantial hazard when subjected to heat such as flame and adequate ventilation is not provided. Noxious and oftentimes toxic fumes are given off which are extremely hazardous in an enclosed space. For example, if halogen-containing or phosphorous-containing plastic structures are employed for aircraft construction within a cabin, exposure of these to heat can result in an undesirable atmosphere and be of more damage than an atmosphere containing merely carbon dioxide from a relatively small fire.

It would be desirable if there were available an improved fire retardant panel of principally organic material which did not contain elements which produced gases other than carbon dioxide and water.

It would also be desirable if there were available a high strength fire retardant panel which is easily fabricated to provide a wide variety of sizes.

It would be further desirable if such a fire retardant panel were available having a relatively low weight.

These benefits and other advantages in accordance with the present invention are achieved in a composite structure, the structure comprising a first high strength non-metallic skin, a second high strength non-metallic skin, the high strength non-metallic skins comprising a thermoset hydroxylated aromatic hydrocarbon-aldehyde resin composition free from elements which generate significant quantities of gases other than carbon dioxide and water on complete combustion in air, a core disposed between the skins, the core comprising from about 5 to 20 weight percent of an open cell plastic foam and from 95 to about 80 weight percent of a thermoset hydroxylated aromatic hydrocarbon-aldehyde resin composition consisting essentially of carbon, hydrogen and oxygen and being without elements that produce noxious gases other than carbon dioxide, water or nitrogen on complete combustion in air.

Further features and advantages of the present invention will become more apparent from the following specification when taken in connection with the drawing wherein:

The figure schematically depicts a structure in accordance with the present invention. In the figure there is shown a structure in accordance with the present invention generally designated by the reference numeral 10. The structure 10 comprises a first facing sheet or skin 11. The first facing sheet or skin 11 comprises a matrix 12 of a thermoset resin composition as hereinbefore described containing therein an inorganic filamentary reinforcing 13. The first skin 11 has an outer face 14 and an inner face 15. A second skin 17 is oppositely disposed from the first face 11. The skin 17 comprises a thermoset matrix 18 of like characteristics to the matrix 12 and has disposed therein filamentary reinforcing 19. The skin 17 has an inner face 20 and an outer face 21. A core 24 is disposed between the faces 15 and 20 of the skins 11 and 17, respectively. The core 24 is adhered to the faces 14 and 21. The core 24 comprises a resinous matrix 25 of an open cell configuration, that is, the core comprises a plurality of interconnected cells 27. The matrix 25 encapsulates a synthetic resinous open cell foam 28. Metallic foil 29 is adhered to the surface 21 of the skin 17.

Beneficially, structures in accordance with the present invention such as the panel 10 are readily fabricated from a wide variety of materials. The high strength skins are advantageous employing a filamentary reinforcing, preferably inorganic reinforcing materials such as glass cloth, glass mat, or a plurality of layers of glass roving encapsulated within a matrix of a resin such as a phenol-formaldehyde to form a solid high strength skin.

Beneficially, a wide variety of thermosetting hydroxylated aromatic hydrocarbon-aldehyde resins are employed. The particular compositions of the resin is not critical provided they consist essentially of carbon, hydrogen, oxygen and nitrogen. Phenol-formaldehyde resins, novolak resins, resorcinol-aldehyde resins are eminently satisfactory. The choice of the particular resin is primarily dependent upon the physical properties desired in the end structure. If desired, the resin may incorporate fillers of a non-combustible nature such as calcium carbonate or minor amounts of cellulosic fillers such as ground wood. However, it is generally desirable to maintain the filler level below about 25 weight percent based on the weight of the resin. It is critical and essential that the resin does not contain significant quantities of elements such as chlorine, bromine, phosphorous and the like which are frequently employed as fire retardants and act as a source of noxious gases when the resin is subjected to sufficient heat in air to cause oxidation. Such resins are well known in the art. One particular advantageous and beneficial composition is set forth in U.S. Pat. No. 2,655,490.

Cellular cores for the preparation of panels in accordance with the present invention are readily prepared employing the process as set forth in my U.S. Pat. No. 3,269,887 wherein an open cell foam is impregnated with a settable resin. However, for the preparation of panels in accordance with this invention, either rigid or flexible open cell foams are employed. Particularly advantageous are the polyurethane foams as set forth in U.S. Pat. No. 3,025,200. Such open cell foams are readily impregnated with a phenol-formaldehyde resin to a desired degree. Beneficially, the open cell foam comprises from about 5 to about 20 weight percent of the core and the resin comprises from 95 to about 80 weight percent of the core. The proportions of resin and open cell foam are most readily controlled when a flexible open cell foam is employed. The flexible open cell foam can be impregnated or saturated with the resin and compressed to squeeze out liquid resin in excess of the quantity desired. However, rigid open cell foams are also useful and the quantity of resin can be controlled by the use of diluents to adjust the viscosity of the uncured or non-thermoset material or by the addition of a predetermined quantity of the uncured liquid resin to the foam and like techniques well known to the art.

Beneficially, panels in accordance with the present invention are prepared by first forming the high strength skins, advantageously by impregnating a suitable reinforcing filament with a liquid thermosetting resin, curing the resin until it has at least reached the B-stage and is self-supporting, impregnating the open cell foam, assembling the panel and subsequently applying heat thereto to cause the resin to become thermoset. Alternately, the skins and cores may be completely cured and assembled employing the thermosetting resin as an adhesive. Beneficially, additional heat resistance is provided by adhering a metallic layer to one of the exposed surfaces of a panel in accordance with the invention. Such a metallic surface which may be beneficially employed to provide exceptional heat resistance is gold leaf which is readily adhered to the surface of fire retardant synthetic resins such as epoxy resins by first coating the surface of the gold leaf to be adhered with a solution of an epoxy novolak resin in a volatile solvent, removing the solvent and subsequently curing the epoxy-novolak resin in contact with a thermosetting epoxy resin adhesive.

A thermosetting resin is prepared in the following manner: a mixture of 44.5 parts by weight of phenol, 55.5 parts of an aqueous formaldehyde solution of 37 weight percent concentration and 1.5 parts of sodium hydroxide is reacted at 60° C. for 6 hours. At this stage of the reaction, the liquid condensation product is water-soluble. The mixture is then acidified by addition of 33 cc. of aqueous sulphuric acid of 30 percent concentration per pound of the mixture to which the acid is added. The acidified mixture is agitated, while warmed to about 40° C. for from 2 to 3 hours. The aqueous and organic layers of the mixture are separated and the organic layer is washed thoroughly with water. The water-insoluble liquid phenol-formaldehyde product thus obtained retains from 20 to 35 percent of water dissolved therein.

A glass fiber mat is impregnated with the foregoing composition, the composition being catalyzed with about one percent by weight of benzene sulfonyl chloride based on the weight of the resin and cured at a temperature of about 80° C. for 6 hours. A sheet of flexible polyether-polyurethane open cell flexible foam having a thickness of one half inch is impregnated with the hereinbefore prepared catalyzed phenolic resin and squeezed until sufficient resin has been removed to provide a weight increase in the sheet of about 6 times the weight of the original open cell foam. The impregnated foam is placed between two sections of the impregnated glass mat and cured at a temperature of about 80° C. for about 6 hours. The resultant composite sheet is light in weight, exhibits high strength and is rigid. A portion of the composite article is supported with the major surfaces vertical. The flame of a propane torch is applied thereto. After a period of about 28 minutes, an opening is burned through the panel. The panel subjected to the flame glows with a red color, exhibits no flame and no noxious fumes are readily apparent to persons present in the room. The quantity of nitrogen in the polyurethane foam does not appear objectionable. An aluminum sheet having a thickness of 0.032 inch spaced an identical distance from the tip of the propane torch melts after a period of about 19 seconds.

Similar beneficial advantages are achieved employing other thermosetting condensation resins of p-cresol-formaldehyde, resorcinol-formaldehyde, α-naphthol-formaldehyde, resorcinol-acetaldehyde, phenol acetaldehyde and the like.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A composite structure, the composite structure comprising
   a first high strength non-metallic skin,
   a second high strength non-metallic skin, the high strength non-metallic skins comprising
   a thermoset hydroxylated aromatic hydrocarbon-aldehyde resin composition free from elements which generate significant quantities of gases other than carbon dioxide and water on complete combustion in air,
   a core disposed between the skins, the core comprising from about 5 to 20 weight percent of an open cell plastic foam and from about 95 to 80 weight percent of a thermoset hydroxylated aromatic hydrocarbon-aldehyde resin composition consisting essentially of carbon, hydrogen and oxygen and being without elements which generate significant quantities of gases other than carbon dioxide and water on complete combustion in air.

2. The composite structure of claim 1 wherein the open cell foam is a polyurethane foam.

3. The structure of claim 1 wherein the hydroxylated aromatic hydrocarbon-aldehyde resin composition is a phenol-formaldehyde resin composition.

4. The structure of claim 1 wherein the high strength non-metallic skin has filamentary reinforcing elements disposed therein.

5. The structure of claim 4 wherein the filamentary reinforcing elements are filamentary glass.

6. The structure of claim 5 wherein filamentary glass is in the form of a glass cloth.

7. The structure of claim 5 wherein the filamentary reinforcing is a glass fiber mat.

8. The structure of claim 1 wherein at least one of the skins has adhered to an exposed face thereof a metallic foil.

9. The structure of claim 8 wherein the metallic foil is gold foil.

References Cited

UNITED STATES PATENTS 3,269,887   8/1966   Windecker _____ 161—160

WILLIAM J. VAN BALEN, Primary Examiner

U.S. Cl. X.R.

156—310; 161—165, 403